(12) United States Patent
Nishimura et al.

(10) Patent No.: US 12,247,511 B2
(45) Date of Patent: Mar. 11, 2025

(54) THERMOSTAT DEVICE AND METHOD FOR MANUFACTURING THERMOSTAT DEVICE (71) Applicant: NIPPON THERMOSTAT CO., LTD., Kiyose (JP)

(72) Inventors: Tetsuya Nishimura, Kiyose (JP); Hitoshi Komatsu, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/286,800

(22) PCT Filed: Apr. 20, 2022

(86) PCT No.: PCT/JP2022/018257
§ 371 (c)(1),
(2) Date: Oct. 13, 2023

(87) PCT Pub. No.: WO2022/224982
PCT Pub. Date: Oct. 27, 2022

(65) Prior Publication Data
US 2024/0200487 A1 Jun. 20, 2024

(30) Foreign Application Priority Data
Apr. 21, 2021 (JP) ................................. 2021-071746

(51) Int. Cl.
*F01P 7/16* (2006.01)
*F16K 31/00* (2006.01)
(52) U.S. Cl.
CPC .............. *F01P 7/16* (2013.01); *F16K 31/002* (2013.01)
(58) Field of Classification Search
CPC .................................. F01P 7/16; F16K 31/002
See application file for complete search history.

(56) References Cited

U.S. PATENT DOCUMENTS 3,680,022 A * 7/1972 Bright .................... H01H 37/36
374/E5.029
2008/0251591 A1 10/2008 Miyamoto et al.

FOREIGN PATENT DOCUMENTS

JP S57-025114 U 2/1982
JP 2005-285398 A 10/2005
(Continued)

OTHER PUBLICATIONS

PCT/ISA/210, "International Search Report for PCT International Application No. PCT/JP2022/018257," Jun. 14, 2022.

*Primary Examiner* — Kevin A Lathers
(74) *Attorney, Agent, or Firm* — HAUPTMAN HAM, LLP (57) ABSTRACT

In a fuel cell cooling device, sliding damage to a piston and the deterioration of sealing performance are prevented despite using a simple structure in which a portion sliding with the piston is made of a brass bushing and a simple and inexpensive method of setting the assembly of the brass bushing to a press-fitted state by light press-fitting and ball burnishing. Provided is a stainless steel cylindrical guide slidably retaining a stainless steel piston, advancing and retracting according to the expansion and contraction of the thermal expansion body, provided at the open end of a bottomed cylindrical case containing a thermal expansion body. A brass bushing is fitted into the inner circumferential portion of the cylindrical guide by light press-fitting and subjected to precision finishing on the inner circumferential surface, for example, by ball burnishing, to be expanded radially by the pressure from the inside and press-fitted.

14 Claims, 4 Drawing Sheets

(56) References Cited

FOREIGN PATENT DOCUMENTS

| | | |
|---|---|---|
| JP | 2008-095918 A | 4/2008 |
| JP | 2020-165441 A | 10/2020 |

\* cited by examiner

THERMOSTAT DEVICE AND METHOD FOR MANUFACTURING THERMOSTAT DEVICE

RELATED APPLICATIONS

The present application is National Phase of International Application No. PCT/JP2022/018257 filed Apr. 20, 2022, and claims priority from Japanese Application No. 2021-071746, filed Apr. 21, 2021, the disclosure of which is hereby incorporated by reference herein in its entirety.

TECHNICAL FIELD

The present invention relates to a thermostat device suitable for use in a fuel cell cooling device in a fuel cell automobile or a stationary type fuel cell power generation system, for example, and to a method for manufacturing the thermostat device.

BACKGROUND ART

A water-cooling type cooling system using a radiator is used for cooling an engine (an internal combustion engine) for automobiles, for example. In such kind of cooling system, a thermostat with a thermal expansion body for adjusting the coolant amount circulating in the radiator side to be able to control the temperature of the coolant introduced into the engine or an electric-controlled valve unit is conventionally employed.

A control valve of the thermostat device using the thermal expansion body is inserted in part of a coolant passage, for example, on an entrance side or exit side of the engine. When the temperature of the coolant is low, the coolant is circulated through a by-pass passage without passing the radiator by closing the control valve, and when the temperature of the coolant is high, the coolant is circulated through the radiator by opening the control valve, whereby the temperature of the coolant is controlled in a predetermined state.

As a conventional thermostat device of this type for the cooling device of the engine of an automobile, there is one disclosed in Patent Literature 1, for example; that is, a thermo-element is disclosed having a configuration that a piston made of stainless steel (SUS) which advances and retracts responding to the expansion and contraction of the thermal expansion body is retained slidably by cylindrical guide made of brass in an opening end of a bottomed cylindrical case made of brass in which a thermal expansion body is enclosed.

In the thermo-element in Patent Literature 1, a bushing made of stainless steel, achieving excellent slidability of the piston and chemical stability against antifreeze or rust inhibitor in the coolant, is disposed at the inner circumferential portion of the cylindrical guide made of brass. This configuration allows to ensure the motion of the piston in a predetermined state.

The above-configured thermostat device is problematic to be employed in use as a fuel cell cooling device in a fuel cell automobile and a stationary type fuel cell power generation system which have been actively developed recently, though less problematic for the use in the cooling device of the engine.

When described more in detail, in the thermo-element in the thermostat device for fuel cell automobiles, for example, the dissolution of ions into the coolant in the coolant circuit may cause the risk of electric leakage in contrast to the case of gasoline-powered automobiles now in general. For this reason, it is preferable that the guide may also be made of stainless steel for the piston made of stainless steel to reduce ion dissolution from brass material.

In other words, the conductivity of the coolant for cooling the fuel cell must be kept low to prevent electrical leakage. Since brass is a material whose ions are subject to being dissolved, there may be a possibility of increasing the conductivity of the coolant due to the dissolved ions and anxiety of loss of function due to the stress corrosion cracking of brass material originated by the ion dissolution. Accordingly, in thermostat devices for fuel cell automobiles, etc., to reduce the dissolution of ions, there are some cases where a guide that retains a stainless steel piston slidably in place is made of stainless steel, and a bottomed cylindrical case is made of stainless steel.
(See Patent Literature 2, for example)

LIST OF CITATIONS

Patent Literature

PTL 1: JP-UM-A-SHO57-25114
PTL 2: JP-A-2005-285398

SUMMARY OF INVENTION

Technical Problem

When a stainless steel piston retained by a stainless steel guide slidingly moves or a stainless steel piston slidingly moves in a stainless steel bushing placed on the inner circumferential portion of a cylindrical guide as described above, there might be a problem that the piston is scratched during sliding, and the sealing performance deteriorates.

To prevent this problem, the piston could be surface-treated (plating or quenching), but this may cause to raise the cost. In addition, the piston sliding portion of the stainless-steel-made guide has greater difficulty in machining than the brass-made one, and the problem of an increase in cost cannot be avoided.

That is, of the stainless-steel-made guide, the dimensional control of the inner diameter is difficult because the piston sliding portion is formed by cutting. When the bushing is press-fitted into the inner circumferential portion of the guide, the outer diameter of the bushing is made larger than the inner diameter of the guide to prevent the bushing from coming off. Further, there are various problems in machining such that since, when the press-fitting is performed, it is necessary to firmly push using an appropriate processing machine, the work difficulty becomes higher, and the inner surface of the bushing becomes rough, possibly damaging the piston.

The present invention is made focusing on the above situation, and the object thereof is to provide a thermostat device that allows the prevention of the deterioration of sealings at the sliding portion of the piston, the elimination of surface treatment to prevent damaging the piston, and the cost reduction, and a method for manufacturing thereof.

Solution to Problem

According to a first means to accomplish the object, a thermostat device includes a cylindrical guide made of stainless steel, provided at the opening end of a bottomed cylindrical case made of stainless steel in which a thermal expansion body is sealed, slidably retaining a piston made of stainless steel advancing and retracting in response to the expansion and contraction of the thermal expansion body and is provided with a brass bushing in a press-fitted state in the piston sliding portion in the inner circumferential portion of the cylindrical guide.

With this configuration, since the sliding damage of the piston is prevented by employing a brass bushing for the sliding portion against the piston, deterioration of sealing is prevented, surface treatment for preventing damage to the piston is not necessary, and cost reduction is achieved.

Further, in the thermostat device, the brass bushing is fitted into the inner circumferential portion of the cylindrical guide in a lightly press-fitting state and also may be in a press-fitted state with the diameter expanded under pressure from the inside by performing precision-finishing of the inner surface. With this, since the cylindrical guide, even made of stainless steel, should be machined to the extent that the brass bushing can be lightly press-fitted in the inner circumferential portion and the work difficulty can be inhibited in comparison to the piston sliding portion, cost reduction can be achieved.

Further, in the thermostat device, the brass bushing is fitted into the inner circumferential portion of the cylindrical guide in a lightly press-fitting state, and also the brass bushing is provided in a press-fitted state by expanding the diameter under applied pressure from the inside due to ball burnishing as a finishing processing of the inner circumferential surface of the brass bushing. With this, since the brass bushing is expanded in diameter, causing it to inhibit from coming off by performing ball burnishing to the sliding portion against the piston as a finishing process, the bushing is only to be lightly press-fitted when the bushing is assembled, the assemblability comes better, and the assembly equipment can be simplified compared to the conventional ones. Further, since the inner circumferential surface of the brass bushing is finished precisely, it is also advantageous that the piston is hard to damage.

Further, in the thermostat device, an annular step forming an annular groove may be provided at a portion of the inner circumferential surface of the cylindrical guide corresponding to the tip portion on the press-fitting side in the axial direction of the brass bushing. With this structure, when the brass bushing whose inner circumferential surface is performed by the finishing process is expanded in the inner diameter by the applied pressure from the inside, the deformed portion pushed out escapes to the annular groove. This prevents the deformed portion from projecting toward the neighboring parts side, such as an O-ring to contact, and a problem of adversely affecting the sealing state is prevented.

Further, in the thermostat device, a tapered portion gradually reducing in diameter from the tip end may be provided on the inner circumferential surface of the tip end on the press-fitting side in the axial direction of the brass bushing to be press-fitted to the inner circumferential portion of the cylindrical guide. With this structure, when the brass bushing, whose inner circumferential surface is performed by the finishing process, is expanded in the inner diameter by the applied pressure from the inside, the deformed portion pushed out escapes to the gap between the tapered portion and the piston. This prevents the deformed portion from projecting toward the neighboring parts side, such as an O-ring to contact, and a problem of adversely affecting the sealing state can be avoided.

Further, the thermostat device may be the one that is used in a fuel cell cooling device for the fuel cell power generation system. Since making only the piston sliding portion of the cylindrical guide made of brass bushing allows the reduction of the dissolution of ions, the thermostat device is suitable for use in the fuel cell cooling device in fuel cell automobiles and fuel cell power generation systems.

According to a second means to accomplish the object, a method for manufacturing a thermostat device includes the thermostat device including a stainless steel cylindrical guide, provided at the opening end of a stainless steel bottomed cylindrical case in which a thermal expansion body is sealed, slidably retaining a stainless steel piston advancing and retracting in response to the expansion and contraction of the thermal expansion body, wherein a brass bushing, slidably retaining a stainless steel piston, that is fitted into the inner circumferential portion of the cylindrical guide in a lightly press-fitting state, and by performing finish the inner surface to a precise finishing, the brass bushing is provided in a press-fitted state by expanding the diameter under pressure from the inside.

With this configuration, since the sliding damage of the piston is prevented by employing a brass bushing for the sliding portion against the piston, deterioration of sealing is prevented, surface treatment for preventing damage to the piston is not necessary, and cost reduction is achieved. Further, since the cylindrical guide even made of stainless steel should be machined to the extent that the brass bushing can be lightly press-fitted in the inner circumferential portion and the work difficulty can be inhibited in comparison to the piston sliding portion, cost reduction can be achieved.

In the method for manufacturing the thermostat device, the brass bushing is inserted into the inner circumferential portion of the cylindrical guide in a lightly press-fitting state, and, as well the bushing may be in the press-fitted state by applying a ball burnishing process as a finishing process to the inner surface of the brass bushing and expanding the diameter of the brass bushing by applying pressure from the inside. With this, since the brass bushing is expanded in diameter causing it to inhibit from coming off by performing the ball burnishing process to the sliding portion against the piston as a finishing process, the bushing is only to be lightly press-fitted when assembled, the assemblability comes better as well, and the assembly equipment can be simplified compared to the conventional ones. Further, since the inner circumferential surface of the brass bushing is finished precisely, it is also advantageous that the piston is hard to damage.

In the method for manufacturing the thermostat device, an annular step forming an annular groove may be provided at a portion of the inner circumferential surface of the cylindrical guide corresponding to the tip portion on the press-fitting side in the axial direction of the brass bushing. With this structure, when the brass bushing whose inner circumferential surface is performed by the finishing process is expanded in the inner diameter by the applied pressure from the inside, the deformed portion pushed out escapes to the annular groove. This prevents the deformed portion from projecting toward the neighboring parts side, such as an O-ring to contact, and a problem of adversely affecting the sealing state is prevented.

In the method for manufacturing the thermostat device, a tapered portion may be provided gradually reducing in diameter from the tip end at the inner circumferential surface of the tip end on the press-fitting side in the axial direction of the brass bushing to be press-fitted in the inner circumferential portion of the cylindrical guide. With this structure, when the brass bushing whose inner circumferential surface is subjected to the finishing process is expanded in the inner diameter by the applied pressure from the inside, the deformed portion pushed out escapes to the gap between the tapered portion and the piston. This prevents the deformed portion from projecting toward the neighboring parts side, such as an O-ring to contact, and a problem of adversely affecting the sealing state can be avoided.

Further, in the method for manufacturing the thermostat device, the thermostat device may be the one that is used in a fuel cell cooling device for the fuel cell power generation system. Since making only the piston sliding portion of the cylindrical guide made of brass bushing allows the reduction of the dissolution of ions, the thermostat device is suitable for use in the fuel cell cooling device in fuel cell automobiles and fuel cell power generation systems.

Advantageous Effects of Invention

With the thermostat device and the method for manufacturing the thermostat device according to the present invention, the prevention of the deterioration of sealings, the elimination of surface treatment to prevent damaging the piston, and thereby cost reduction can be achieved.

DESCRIPTION OF EMBODIMENTS

FIGS. 1A through 1D and FIGS. 2A and 2B show the first embodiment of the thermostat device and the method for manufacturing the thermostat device according to the present invention. In this embodiment, cases in which the thermostat device is used in a cooling device for a fuel cell of a fuel cell automobile or a stationary type fuel cell power generation system.

Figure 2A:
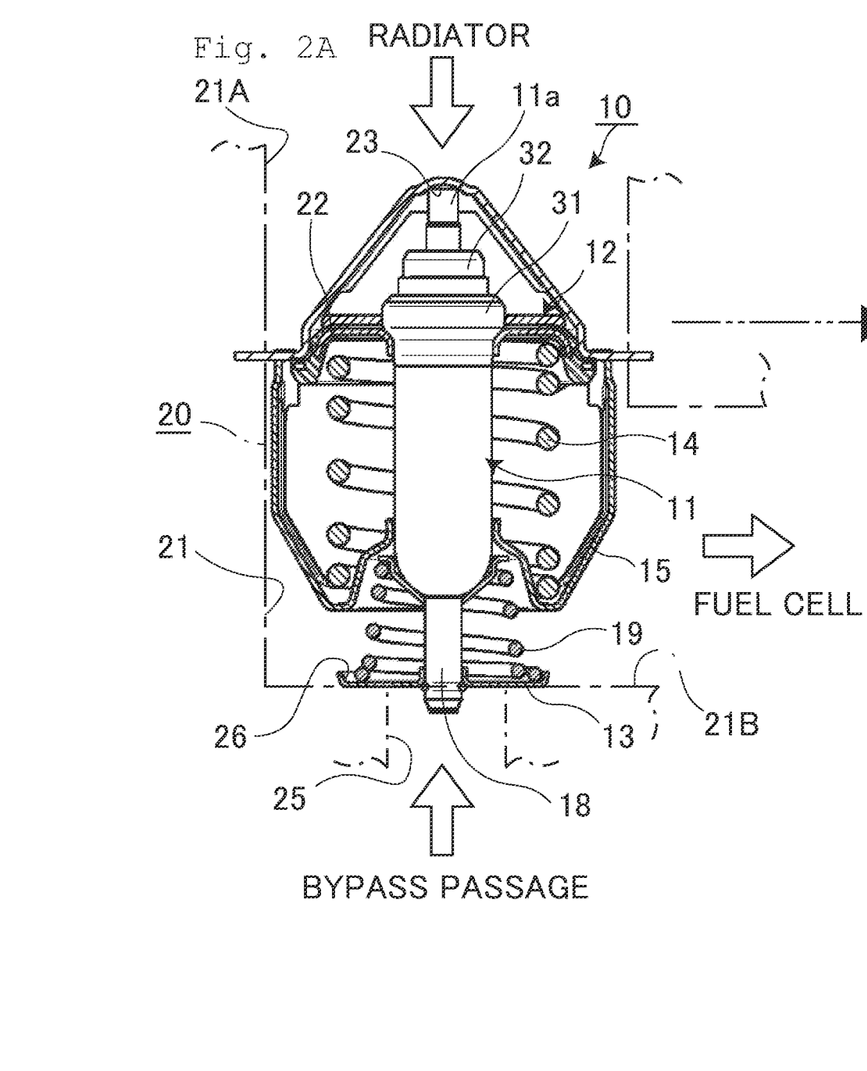
FIGS. 2A and 2B are a schematic side view of the whole system and an enlarged cross-sectional view of the main part illustrating the first embodiment of the thermostat device according to the present invention.

In these drawings, a thermostat device, a temperature-sensing automatic valve, is denoted by a reference sign 10 as a whole. The thermostat device 10 is annexed at an intersection of the cooling passage of the radiator side and the by-pass passage from the exit side of the fuel cell cooling passage in the fuel cell cooling device (not shown) in the fuel cell power generation system of a fuel cell automobile, for example. The thermostat device 10 is used to control the temperature of coolant toward the entrance of the fuel cell cooling passage by selectively switching the coolant flow in the fluid passage composed of these passages. FIG. 2A exemplifies the flow of coolant in the inlet-control type thermostat device, but the flow shown in the drawing is obviously reversed in the outlet-control type one.

Figure 2B:
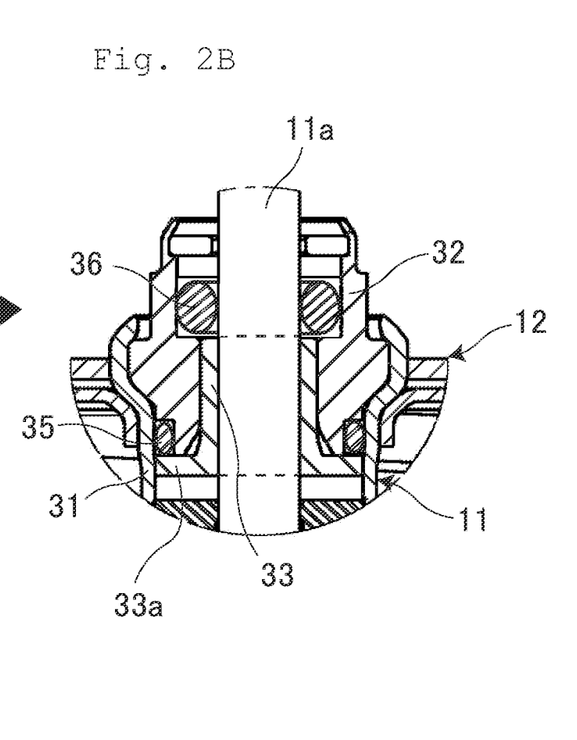

As shown in FIGS. 2A and 2B, the thermostat device 10 has a thermo-element 11, which is an actuator that is activated by temperature changes in the fluid, and a first valve body 12, which is almost umbrella-shaped, is provided at one-end side (upper side in the drawing) of the thermo-element 11, and a second valve body 13, which is almost plate-shaped, is provided at the tip-end side (lower end side in the drawing) of the valve stem (described below) that extends to the other end (lower side in the drawing). Further, in the central area in the axial direction of the thermo-element 11, a coil spring 14, which is a biasing means to bias the first valve body 12 to the valve-closed position, and a frame 15 also serving as a spring retainer are provided by insertion. The frame 15 is a member biasing the first valve body 12 to the valve-closed direction through the coil spring 14 by being fastened to the support legs on the valve housing side, a fixing member to be described below, and slidably holds the thermo-element 11.

The thermo-element 11 is provided with a temperature sensing unit in which a thermal expansion body such as wax is sealed that expands and contracts by sensing the temperature of the fluid, and a piston rod (hereinafter referred to as piston) 11a protrudes advancing and retracting freely from the tip end of the temperature sensing unit (upper end in the drawing).

Reference sign 20 in the drawing denotes housing that constitutes a passage through which the coolant from the radiator, the fluid inlet/outlet, flows in and is communicated with the inlet of the fuel cell cooling passage, as well as housing and arranging the thermostat device 10 inside. Inside the housing 20, a valve chamber 21 is formed in which thermostat device 10 is disposed, and also a coolant passage (a first passage) 21A from the radiator shown in the upper side in the drawing, a coolant passage (a second passage) 21B toward the fuel cell shown on the right side in the drawing, and a fluid passage 25 from the by-pass passage (a third passage) shown at the lower side in the drawing are formed. In this case, housing 20 has a structure of being divided into upper and lower portions.

A valve seat 22, to which the first valve body 12 opposes so as to able to seat, is formed inside the flange-like member disposed at the middle of the longitudinal direction of the thermostat device 10. The thermo-element 11, the frame 15 holding it slidably, and others are incorporated, in a state the first valve body 12 can be seated on the valve seat 22.

Further, reference sign 23 in the drawing denotes a locking portion that locks to hold the tip end of the piston 11a. It is constructed that in the state of FIG. 2A, when the piston 11a protrudes upward in the drawing due to the thermal expansion of the thermal expansion body, the thermo-element 11 and the first valve body 12 relatively move downward in the drawing, the first valve body 12 becomes in a valve-opened state appropriately, and the coolant from the radiator is delivered to the engine side.

Meanwhile, at the lower end of the rod 18, as the valve stem, extended downward from the thermo-element 11, the second valve body 13, approximately plate-shaped, is inserted and attached and fixed with an E-clip, for example, and is elastically supported by being biased by the coil spring 19. At the lower portion of the housing 20, a fluid passage (communication passage) 25 which is opened and closed by the second valve body 13 opens, and a valve seat 26 is formed at the peripheral edge of the opening.

The second valve body 13 is constructed to be seated on the valve seat 26 and configured to function as a relief valve which is opened and closed depending on the coolant pressure at the by-pass passage side.

The present invention is characterized in that the thermo-element 11 has a constitution as shown in FIG. 2B in the thermostat device 10 in the described above constitution. That is, the thermostat device 10 is provided with a stainlesssteel-made cylindrical guide 32 which holds the stainless steel piston 11a slidably, which is provided at the opening end of the stainless steel bottomed cylindrical case 31 in which a thermal expansion body (not shown) is sealed and performs an advancing and retracting operation according to the expansion and contraction of the thermal expansion body. In addition, a brass bushing 33 is provided in a press-fitted state at the piston sliding portion in the inner circumferential portion of the cylindrical guide 32.

The brass bushing 33 is formed having a brimmed shape capable of constraining movement in the axial direction. Reference sign 33a in the drawings denotes the brim. In the brass bushing 33, the end of which side is press-fitted in the inner circumferential portion of the cylindrical guide 32 is defined to be the tip end, and the brim 33a side is the back end. The opening end of the bottomed cylindrical case 31 of the thermo-element 11 is crimped in a state where the cylindrical guide 32 slidably holding the piston 11a is fitted in, and locked in a without-coming-off state. Further, reference signs 35 and 36 in FIG. 2B are O-rings respectively sealing between the bottomed cylindrical case 31 and cylindrical guide 32, and between the cylindrical guide 32 and the piston 11a.

Figure 1A:
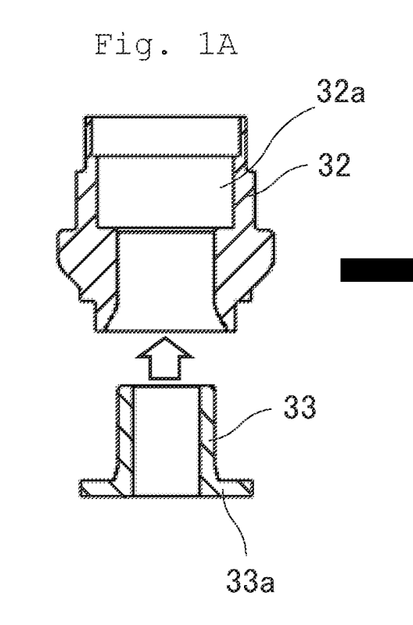
FIGS. 1A, 1B, 1C, and 1D are the explanatory drawings of a first embodiment of the method for manufacturing the thermostat device according to the present invention.
Figure 1B:
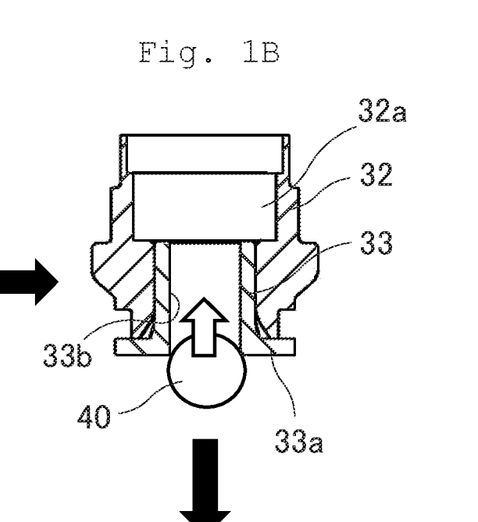
Figure 1C:
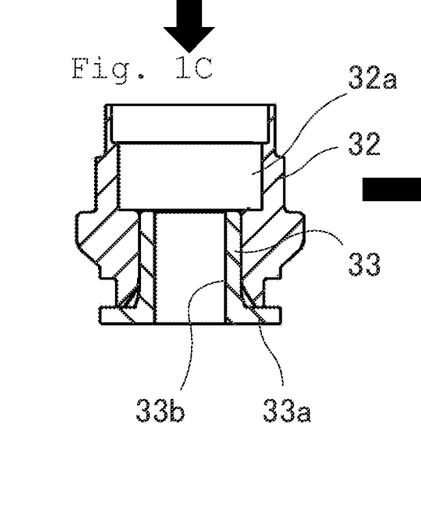
Figure 1D:
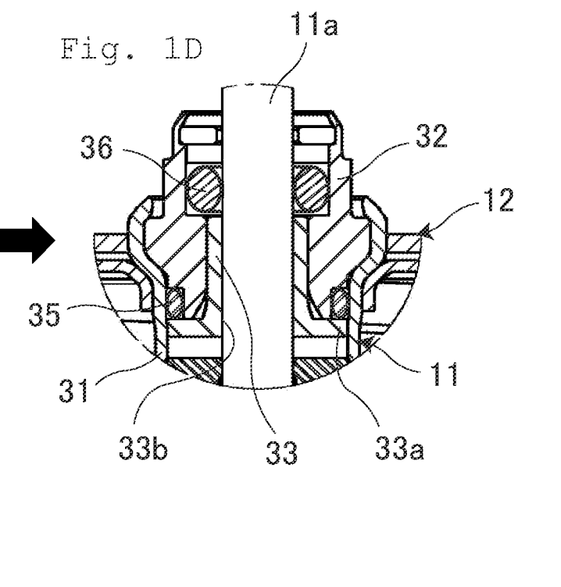

In the above configuration, the assembly of the brass bushing 33 into the cylindrical guide 32 is carried out as described below. That is, as shown in FIG. 1A, the brass bushing 33 lightly press-fitted in the inner is circumferential portion of the cylindrical guide 32 from the tip-end side. The setting value for the press-in margin due to the inner-outer diameter difference between the cylindrical guide 32 and the brass bushing 33 is set to be 0.06 mm to 0.10 mm, for example.

With this, machining accuracy is not required at the assembly portion of the cylindrical guide 32 and the brass bushing 33; it is advantageous not only in machinability, no particular tools for assembly are required, but also assembly is easily and surely carried out, and cost reduction can be possible.

In a lightly press-fitted state described above, as shown in FIG. 1B, the ball burnishing process, for example, as a precision finishing process, is applied to the inner circumferential surface 33b of the brass bushing 33; the precision finishing of the inner circumferential surface 33b is carried out while expanding the brass bushing 33 by applying force from the inside. The design setting value of the change of the inner diameter of the brass bushing 33 before and after the ball burnishing process is to be around 0.01 mm. As a precision finishing process, roller burnishing, for example, other than ball burnishing, can be applied, and another process capable of performing the precision finishing to the brass bushing 33 from the inner circumferential surface 33b may be applicable.

As a result, the brass bushing 33 is placed in the inner circumferential portion of the cylindrical guide 32 in a press-fitted state. Thus assembled cylindrical guide 32 with the brass bushing 33 is fitted in the opening end of the bottomed cylindrical case 31 in a state where the piston 11a is held slidably and is fixed by crimping the opening end of the bottomed cylindrical case 31 to complete the thermo-element 11.

The ball burnishing process is also applied to the piston sliding portion of the conventional brass guide and is a process for adjusting the inner diameter size of the piston sliding portion and reducing the surface roughness of the inner circumferential surface thereof by passing a ball 40 with a slightly larger diameter (a ball burnishing processing tool) through the piston sliding portion of the guide after cutting machining processing.

According to the thermostat device 10 and the method for manufacturing the thermostat device 10 of the present invention, since, by using the brass bushing 33 at the sliding portion with the piston 11a, the sliding scratches of the piston 11a can be prevented, the deterioration of sealability is inhibited and surface finishing for preventing scratches of the piston 11a is unnecessary, whereby cost reduction can be achieved.

Further, according to the configuration described above, even when the cylindrical guide 32 is made of stainless steel, it only needs to be machined to the extent that the brass bushing 33 can be lightly press-fitted into its inner circumferential portion, and further, the machining difficulty can be reduced compared to that of the piston sliding portion, whereby costs can be reduced.

Further, according to the configuration and the manufacturing method described above, the brass bushing 33 is prevented from coming off by being expanded in the inner diameter by performing the ball burnishing process to the sliding portion with the piston 11a as the finishing processing, the brass bushing 33 is only to be lightly press-fitted when assembled, and the assemblability becomes excellent. Further, since the inner circumferential surface of the brass bushing 33 can be finished precisely, it is advantageous that the piston 11a is hard to scratch.

When, as described above, the brass bushing 33, which is lightly press-fitted into the inner circumferential portion of the cylindrical guide 32 made of stainless steel, is subjected to the ball burnishing process as the finishing process and the inner circumferential portion of the brass bushing 33 is expanded, there may be a risk of inconvenience that the brass bushing 33 extends in the axial direction due to the pushed and wrinkled material and protrudes in a convex shape into the space 32a where the neighboring O-ring 36 is mounted.

To solve such a problem, the length of the brass bushing 33 to be fitted to the inner circumferential portion of the cylindrical guide 32 may be shortened in the axial direction in advance. This eliminates the protrusion problem due to performing the ball burnishing process to the inner circumferential portion of the brass bushing 33 as a finishing process.

FIGS. 3A through 3D show a second embodiment to solve the protruding problem due to performing the ball burnishing process to the inner circumferential surface of the brass bushing 33 as a finishing process. In the drawings, the same or equivalent portions in the above-described embodiment are denoted by the same reference signs, and the detailed description thereof will be omitted.

In this embodiment, an annular step 51 forming the annular groove 50 is formed at the corresponding portion to the tip end of the press-fitting side in the axial direction of the brass bushing 33 in the inner circumferential surface of the cylindrical guide 32.

In the detailed description, an axial hole for press-fitting the brass bushing 33 opens at the end facing space 32a for mounting the O-ring 36 at the inner circumferential portion of the cylindrical guide 32. At the periphery of the axial hole, an annular step 51 constituting the annular groove 50 is formed as a recess along the axial direction against the seating surface 32 for the O-ring 36.

Figure 3A:
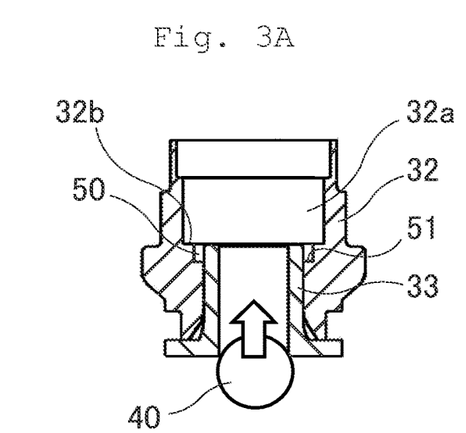
FIGS. 3A, 3B, and 3C are enlarged cross-sectional views of the main part of a second embodiment of the thermostat device and the method for manufacturing the thermostat device according to the present invention.
Figure 3B:
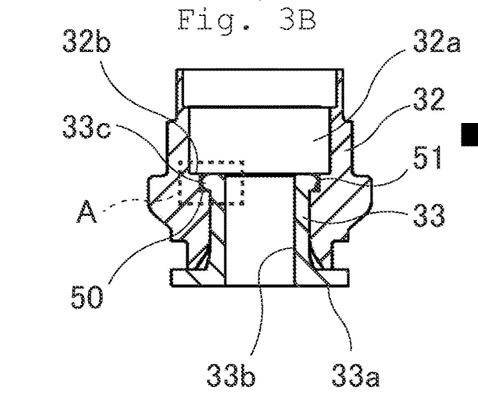
Figure 3C:
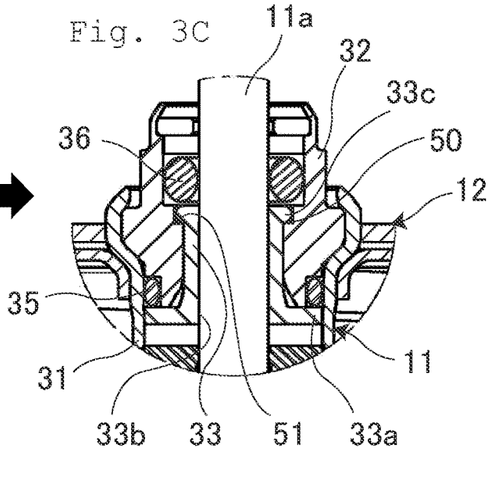
Figure 3D:
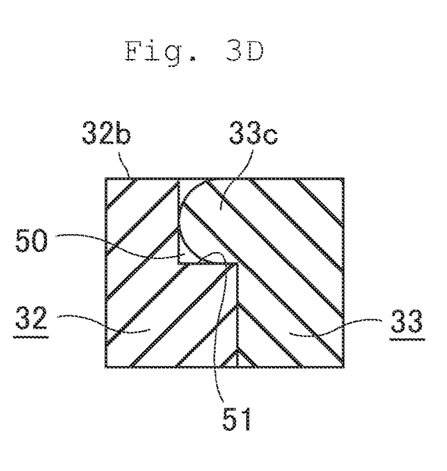
FIG. 3D is an enlarged cross-sectional view of part A of the FIG. 3B.

In the case where the annular groove 50 is formed by the annular step 51, the brass bushing 33 is fitted into the inner circumferential portion of the cylindrical guide 32 by light press-fitting. In addition, when the ball burnishing process is applied to the inner circumferential surface of the brass bushing 33 using the ball 40 as a finishing process as shown in FIG. 3A, the brass bushing 33 is extended in diameter by the applied force from the inside, and a deformed portion 33c pushed out then escapes into an annular groove 50 formed by an annular 51 formed on the inner circumferential surface of the cylindrical guide 32.

That the deformed portion 33c due to the raised material of the brass bushing 33 by the ball burnishing process escapes into the annular groove 50 allows preventing protruding as a convex shape into the space 32a (the upper than the seating surface 32b in FIG. 3B) where the neighboring O-ring 36 is mounted. Accordingly, when the thermostat device 10 is assembled, the deformed portion 33c of the brass bushing 33 is prevented from touching the O-ring 36, which is the part adjacently provided. As a result, such a problem that the O-ring 36 may adversely affect the sealing status is completely and safely prevented.

In the above-described embodiment shown in FIGS. 3A through 3D, an annular groove 50 formed by the annular step 51 is formed at the portion corresponding to the tip end of the press-fitting side in the axial direction of the brass bushing 33 of the cylindrical guide 32, and the present invention is not limited by this structure.

Figure 4A:
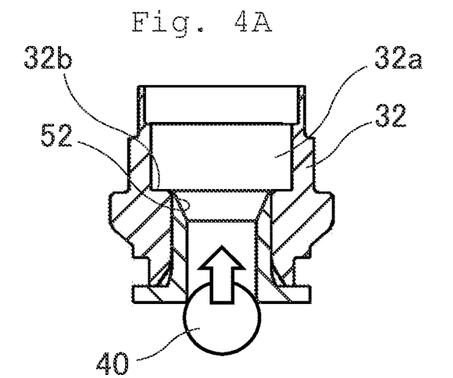
FIGS. 4A, 4B, and 4C are enlarged cross-sectional views of the main part illustrating variation examples of the thermostat device and the method for manufacturing the thermostat device of FIGS. 3A, 3B, and 3C.
Figure 4B:
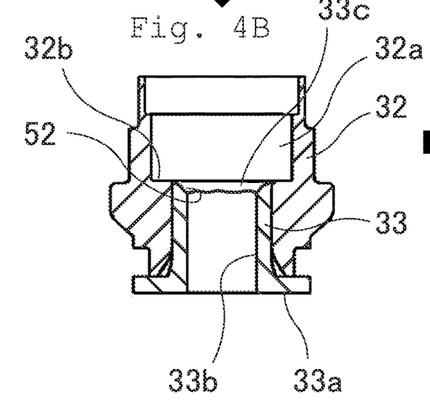
Figure 4C:
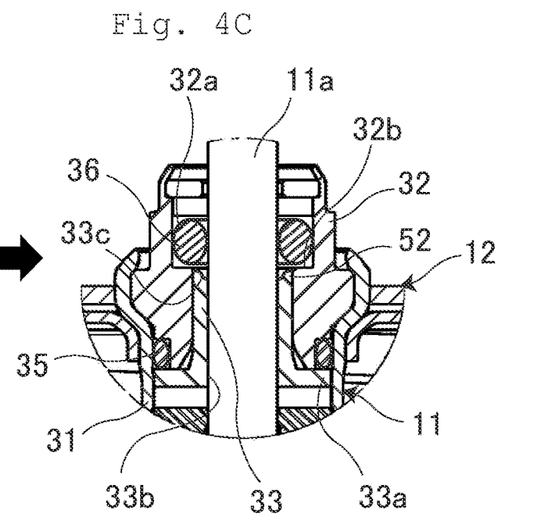

For example, as shown in FIGS. 4A through 4C, a tapered portion 52 may be constructed, having an inverted truncated cone that gradually reduces in diameter from the tip side, along the entire circumference of the inner circumferential surface of the tip end of the press-fit side in the axial direction toward the inner circumferential portion of the cylindrical guide 32 of the brass bushing 33.

When the tapered portion 52 is formed, the deformed portion 33c, pushed out when the brass bushing 33 is expanded in diameter by the applied pressure from inside by the ball burnishing process, can escape to the annular space formed with the tapered portion 52. This can prevent the deformed portion 33c due to the ball burnishing process to the brass bushing 33 from protruding as a convex shape into the space 32a (the upper than the seating surface 32b in FIG. 4B) where the neighboring O-ring 36 is mounted.

Accordingly, when the thermostat device 10 is assembled, the deformed portion 33c of the brass bushing 33 is prevented from touching the O-ring 36. As a result, such a problem that the O-ring 36 may adversely affect the sealing status is completely and safely eliminated.

The effect, of course, is not limited to the tapered portion 52 formed at the inner circumferential surface of the tip-end side of the brass bushing 33. For example, the brass bushing 33 may be configured to have a tapered portion, having an inverted truncated cone that gradually increases in outer diameter from the tip end side, along the entire circumference of the outer circumferential surface of the tip end side of the press-fit side in the axial direction; it is easily understood that this will achieve similar effects.

The invention is not limited to the structure described in the above-mentioned embodiments. The shape, structure, etc., of each part, composing the thermostat device 10 and the method of manufacturing the thermostat device 10, can be modified or changed as necessary. For example, various variations are possible for a structure other than the assembly consisting of the cylindrical guide 32 fitted into the opening end of the bottomed cylindrical case 31 and the brass bushing 33, which is attached to the inner circumferential portion thereof in a press-fitted state.

In the thermostat device 10 of inlet- or outlet-controlled type used for fuel cell cooling devices, such as in fuel cell automobiles or stationary fuel cell power generation systems, the invention also has the thermo-element 11 as its characteristic part in particular. The above-mentioned thermostat device 10 can be effectively used in cooling devices for automobile engines (internal combustion engines), for example, and even in hot water temperature control in hot water mixing faucets.

REFERENCE SIGN LIST

10 Thermostat device
11a piston rod (piston)
31 bottomed cylindrical case
32 cylindrical guide
33 brass bushing
40 ball (ball burnishing processing jig)
50 annular groove
51 annular step
52 tapered portion

The invention claimed is:

1. A thermostat device, comprising:
a bottomed cylindrical case made of stainless steel in which a thermal expansion body is sealed; and
a cylindrical guide made of stainless steel fitted in an opening end of the bottomed cylindrical case, slidably retaining a piston made of stainless steel advancing and retracting in response to the expansion and contraction of the thermal expansion body, wherein
a brass bushing is provided in a press-fitted state in a sliding portion of the piston in the inner circumferential portion of the cylindrical guide.

2. The thermostat device of claim 1,
wherein the brass bushing is fitted into the inner circumferential portion of the cylindrical guide in a press-fitting state, and also is provided in a press-fitted state with the diameter expanded under pressure from the inside by performing a finishing process for precision finishing of the inner circumferential surface, and the press-fitting state comprises a press-in margin which is set due to the inner-outer diameter difference between the cylindrical guide and the brass bushing.

3. The thermostat device of claim 1,
wherein the brass bushing is fitted into the inner circumferential portion of the cylindrical guide in a press-fitting state, and also is provided in a press-fitted state by expanding the diameter under applied pressure to the brass bushing from the inside due to the ball burnishing process as a finishing process of the inner circumferential surface of the brass bushing, and the press-fitting state comprises a press-in margin which is set due to the inner-outer diameter difference between the cylindrical guide and the brass bushing.

4. The thermostat devices of claim 3,
wherein an annular step forming an annular groove is provided at a portion on the inner circumferential surface of the cylindrical guide corresponding to a tip portion on the press-fitting side in the axial direction of the brass bushing.

5. The thermostat devices of claim 3,
wherein a tapered portion gradually reducing in diameter from the tip end is provided on the inner circumferential surface of the tip end on the press-fitting side in the axial direction of the brass bushing press-fitted to the inner circumferential portion of the cylindrical guide.

6. The thermostat device of claim 2,
wherein the brass bushing is fitted into the inner circumferential portion of the cylindrical guide in the press-fitting state, and also is provided in a press-fitted state by expanding the diameter under applied pressure to the brass bushing from the inside due to the ball burnishing process as a finishing process of the inner circumferential surface of the brass bushing.

7. The thermostat devices of claim 2,
wherein a tapered portion gradually reducing in diameter from the tip end is provided on the inner circumferential surface of the tip end on the press-fitting side in the axial direction of the brass bushing press-fitted to the inner circumferential portion of the cylindrical guide.

8. The thermostat device in claim 1, wherein the thermostat device is to be used in a fuel cell cooling device of a fuel cell power generation system.

9. A method for manufacturing a thermostat device having a cylindrical guide made of stainless steel, provided at an opening end of a bottomed cylindrical case made of stainless steel in which a thermal expansion body is sealed, slidably retaining a piston made of stainless steel advancing and retracting in response to the expansion and contraction of the thermal expansion body, comprising steps of:
fitting a brass bushing, which slidably holds the piston, into the inner circumferential portion of the cylindrical guide member in a press-fitted condition, the press-fitting condition comprises a press-in margin which is set due to the inner-outer diameter difference between the cylindrical guide and the brass bushing; and
providing the brass bushing in a press-fitted state in the inner circumferential portion of the cylindrical guide by expanding the inner diameter by applying pressure from the inside by performing a precision finishing process to the inner circumferential surface of the brass bushing.

10. The method for manufacturing the thermostat device of claim 9,
wherein a deformed portion pushed out due to the expansion in diameter of the brass bushing by the applied pressure from the inside when the inner circumferential surface of the brass bushing is subjected to the finishing process is configured to escape into an annular groove formed by a step provided at a portion of the inner circumferential surface of the cylindrical guide corresponding to the tip portion on the press-fitting side in the axial direction of the brass bushing.

11. The method for manufacturing the thermostat device of claim 9,
wherein a deformed portion pushed out due to the expansion in diameter of the brass bushing by the applied pressure from the inside when the inner circumferential surface of the brass bushing is subjected to the finishing process is configured to escape into an annular groove formed by a step provided at a portion of the inner circumferential surface of the cylindrical guide corresponding to the tip portion on the press-fitting side in the axial direction of the brass bushing.

12. The method for manufacturing the thermostat device according to claim 9, wherein a ball burnishing process is applied as the finishing process.

13. The method for manufacturing the thermostat device of claim 12,
wherein a deformed portion pushed out due to the expansion in diameter of the brass bushing by the applied pressure from the inside when the inner circumferential surface of the brass bushing is subjected to the finishing process is configured to escape into an annular groove formed by a step provided at a portion of the inner circumferential surface of the cylindrical guide corresponding to the tip portion on the press-fitting side in the axial direction of the brass bushing.

14. The method for manufacturing the thermostat device of claim 12,
wherein a deformed portion pushed out due to the expansion in diameter of the brass bushing by the applied pressure from the inside when the inner circumferential surface of the brass bushing is subjected to the finishing process is configured to escape into a space formed by a tapered portion gradually reducing in diameter from the tip end side formed at the inner circumferential surface of the tip end on the press-fitting side in the axial direction of the brass bushing that is to be press-fitted in the inner circumferential portion of the cylindrical guide.

* * * * *